July 28, 1964　　　A. C. KRACKLAUER　　　3,142,642
PLATE FILTER AND METHOD OF MANUFACTURE
Filed April 20, 1962　　　2 Sheets-Sheet 1

INVENTOR
Aloysius C. Kracklauer

BY Arnold and Roylance
ATTORNEYS

July 28, 1964 A. C. KRACKLAUER 3,142,642
PLATE FILTER AND METHOD OF MANUFACTURE
Filed April 20, 1962 2 Sheets-Sheet 2

Aloysius C. Kracklauer
INVENTOR.

BY
Arnold & Roylance
ATTORNEYS 3,142,642
PLATE FILTER AND METHOD OF
MANUFACTURE
Aloysius C. Kracklauer, Conroe, Tex., assignor, by mesne assignments, to C.I.T. Corporation, Houston, Tex., a corporation of New York
Filed Apr. 20, 1962, Ser. No. 189,026
8 Claims. (Cl. 210—232)

This invention relates to plate filters and, more particularly, to improved filter units for plate filters and to methods for manufacturing the same.

As commonly adopted for many industrial filtering operations, plate filters comprise an enclosure in which is mounted at least one filter unit. The filter units for such filter apparatus ordinarily include a central upright support, an imperforate bottom plate or pan, and a porous filter element extending across the open top of the plate or pan, the arrangement being such that the liquid to be treated flows through the filter element and the plate or pan, solids collecting on the filter element and the filtrate flowing out a suitable central opening. In a particularly useful form, such devices usually employ an outlet pipe as the central upright support on which the filter units are mounted, and the filtrate simply flows through openings in the wall of the pipe and escapes from the enclosure via the pipe.

It will be apparent that, in such filters, the filter elements must be both adequately supported and arranged for maximum ease of removal and replacement. To this end, prior-art filters have employed filter units in which the plate or pan is either of cast metal or requires use of relatively heavy and intricate machined parts. Such prior-art devices have not only been difficult to assemble but have also been unduly expensive.

A general object of the invention is to provide an improved filter unit of the type described which overcomes the disadvantages of the prior-art devices.

Another object is to devise a particularly advantageous method for manufacturing such filter units.

In order that the manner in which these and other objects are attained in accordance with the invention can be understood in detail, reference is had to the accompanying drawings, which form a part of this specification, and wherein.

Figure 1:
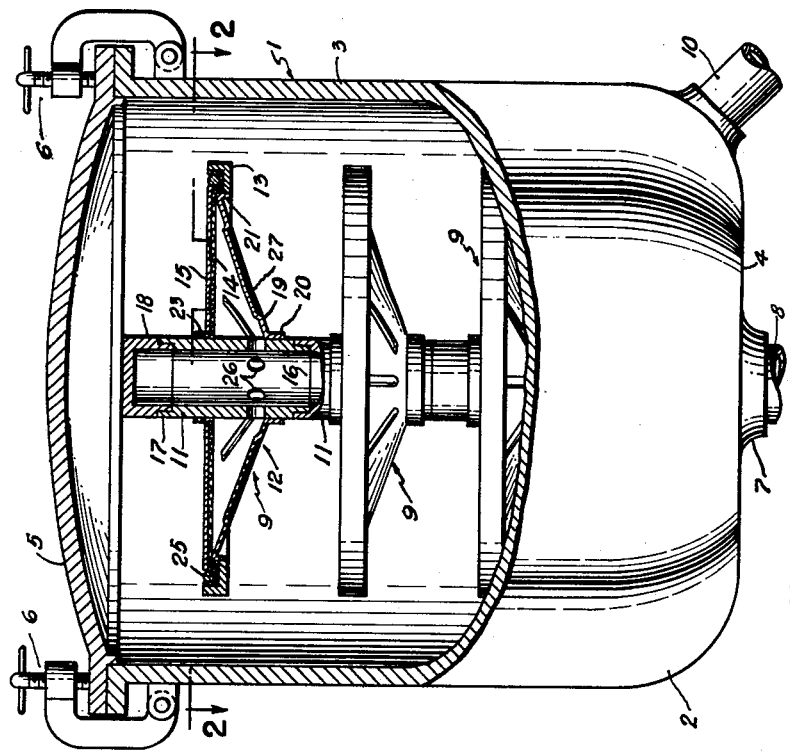
FIG. 1 is a view, partly in side elevation and partly in vertical section, of a filter constructed in accordance with one embodiment of the invention.
Figure 3:
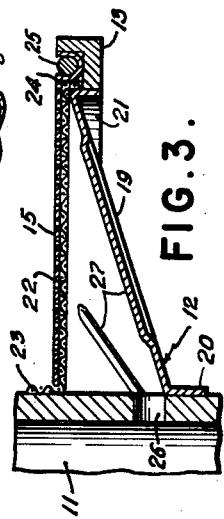
FIG. 3 is an enlarged, fragmentary, vertical sectional view illustrating details of the filter units employed in the apparatus of FIG. 1.
Figure 2:
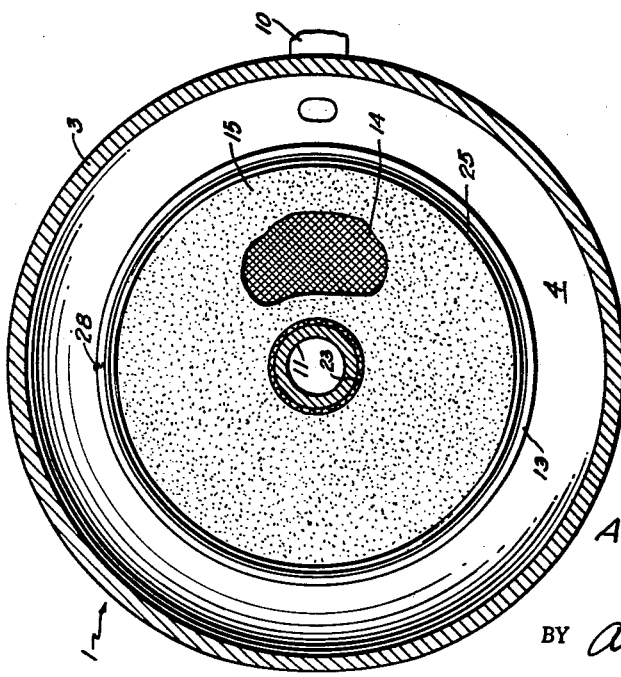
FIG. 2 is a transverse cross-sectional view taken on line 2—2, FIG. 1.

Referring now to the drawings in detail, and first to FIGS. 1–3 thereof, it will be seen that the invention is illustrated as applied to a filter apparatus comprising an enclosure 1 formed by a tank 2 having a cylindrical side wall 3, a bottom wall 4 and a removable top closure 5, the latter being secured by clamping bolts 6. Centrally disposed in bottom wall 4 is a sealing member 7 through which extends a pipe 8, the latter serving both as an exhaust for filtrate and as a support for a plurality of filter units 9. Fluent material from which solids are to be filtered enters the enclosure 1 via an inlet pipe 10, the solids collecting on filter units 9 as hereinafter described, and the filtrate discharging via pipe 8.

Each filter unit 9 comprises a centrally disposed upright cylindrical support tube 11, a bottom pan 12, a rim 13 and a screen 14 for supporting the filter element which, in this embodiment, is a circular sheet of filter paper 15.

Figure 5:
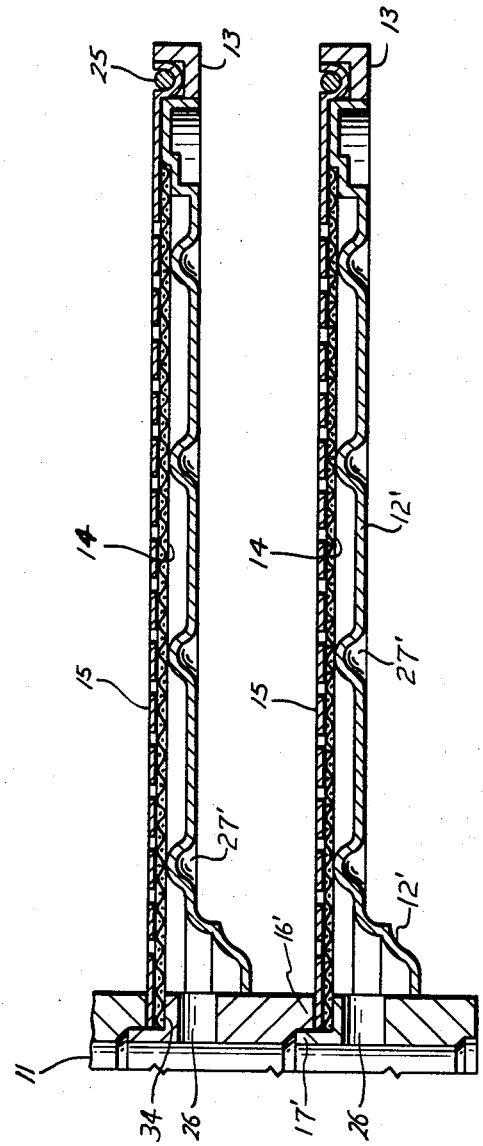
FIG. 5 is a view of an alternative embodiment wherein the screen and filter paper is reinforced against high pressure differentials.

In FIGURES 3 and 5 the draftsman has illustrated the permeability of the filter paper 15 by showing holes therein but it is to be understood that the true holes are not of the dimension illustrated but are rather those of conventional filter elements whether the element be paper, cloth, wire mesh, or other filter element.

Each support tube 11 is adapted to be supported by the next lower tube by the appropriate nesting of the lips thereof. Thus in FIGURE 1, each support tube 11 has a lower tip 16 of reduced external diameter and a corresponding upper tip portion 17 of an enlarged internal diameter adapted to embrace the smaller tip 16 of the next higher filter unit. In the FIGURE 5 embodiment, the upper lip 17' is the one of reduced external diameter fitting inside a lower lip 16' of enlarged internal diameter, and the screen 14 and paper 15 may be bound between such lower lip 16' and a cooperating shoulder 34 of the next lower cylindrical support 11.

The filter units are arranged in a stacked series with support tubes 11 fitted together to constitute an extension of pipe 8, the lowermost one of tubes 11 being fitted to the top of pipe 8 and the top of the assembly being closed by a cap 18.

Each pan 12 serves both to support the corresponding rim 13 and screen 14 and also to confine and direct the filtrate passing through the filter element. Each pan is in the form of an integral imperforate sheet metal member.

In the embodiment of FIGURES 1 and 3 the pan 12 includes a frusto-conical body portion 19 and an inner cylindrical flange 20 depending from the downwardly and inwardly tapered portion of the body portion 19 in coaxial relation therewith. Inner cylindrical flange 20 is secured to tube 11, such connection serving to mount pan 12 on the tube 11. In the embodiment of FIGURE 5 the pan 12' is almost flat but for the dimples 27' discussed hereafter. In each embodiment illustrated the pan 12 also includes an outer cylindrical flange 21 depending from the pan 12 in coaxial relationship therewith.

Each rim 13 is in the form of a circularly extending metal strip of L-shaped transverse cross section, the upright of the L extending parallel to the axis of tube 11 and the base of the L extending horizontally inwardly to engage the outer face of flange 21 at the bottom thereof. Flange 21 and the tip of the base of the L are secured together, so that rim 13 is fixed to pan 12.

In the embodiment of FIGS. 1 through 3, each screen 14 comprises a flat, circular main body portion 22 provided with an upwardly projecting inner cylindrical flange 23, which embraces tube 11, and an outer cylindrical dependent flange 24, coaxial with flange 23 and lying in contact with the exposed upper surface of flange 21. The exposed upper surface of flange 21 is that portion extending above the base of the L of the rim 13.

Referring particularly to FIG. 3, it is seen that the outer face of flange 21 and rim 13 cooperate to define an upwardly opening annular channel to accommodate the outer cylindrical flange 24 of the screen, the outer edge portion of filter element 15 and a retaining ring 25. When filter element 15 is installed, it is first placed on screen 14 and extends across the open top of the open annular channel now defined by screen flange 24 and rim 13, the diameter of the filter element 15 being greater than the maximum diameter of rim 13, so that the outer edge of the filter element projects beyond the rim. Ring 25 is then placed on top of the filter element and pressed downwardly into the groove, deforming the filter element to the shape of the groove and fixing the filter element firmly in place.

As shown in the embodiment of FIGS. 1, 2 and 3, the upright of the L of rim 13 terminates at the plane defined by filter element 15 so that no portion of the annular channel extends above the filter element. This feature permits any unfiltered material remaining on the face of the filter element 15 to drain from this surface when the filter tank is emptied for cleaning. It is also desirable that the width of the groove be slightly less than that required to accommodate the thickness of the screen flange 24 plus the ring 25 plus the double thickness of the filter element 15. This smaller dimension of the groove insures that the fibers of the filter element 15 will be compressed by the ring 25 and proper sealing is thus assured.

It is evident from FIGS. 1–3 that fluid entering the enclosure 1 via pipe 10 is constrained to pass through one of the filter elements 15, so that the filtrate must enter the frusto-conical spaces defined, within each filter unit 9, by elements 11, 12 and 14.

Each tube 11 is provided with a plurality of lateral ports 26 arranged in an annular series disposed just above the top of flange 20, so that the filtrate flowing downwardly along the main body portion 19 of pan 12 is directed through ports 26 into tube 11, thence exhausting via pipe 8. Body portion 19 is provided with a plurality of stiffening dimples or ridges 27 each preferably disposed in a plane which includes the axis of flange 20. Since ridges 27 project upwardly, as best seen in FIG. 3, they may serve not only to rigidify the body portion 19 of pan 12 but also to aid in directing the filtrate inwardly to ports 26.

In the embodiment illustrated in FIGURES 1 through 4, the screen is shown with no support intermediate the support 11 and flange 21. When high pressure differentials or other circumstances make it desirable, the frusto-conical body portion 19 of pan 12 may be rendered substantially planar as pan 12' in FIGURE 5, with the stiffening ridges or dimples 27' protruding upward into contact with the lower side of the screen 14 to lend intermediate support to the screen. In such an arrangement the pressure on the outside of the filter-paper-and-screen and on the outside of the pan 12 is the same and its tendency to collapse the assembly is resisted by the structural reinforcement of the ridges and dimples 27' between screen and body.

In accordance with the method of the present invention, the filter units 9 are fabricated in the following manner. Tube 11 is formed by conventional machining operations, complete with ports 26. Bottom pan 12 is formed from a flat metal sheet, advantageously by spinning the flanges 20–21 and stamping the indentations, dimples or ridges 27, though a stamping operation can be employed alone, instead. In forming pan 12 the inside diameter of flange 20 is made slightly smaller than the outer diameter of tube 11, so that the tube can be pushed through flange 20 until ports 26 are located just above the upper end of flange 20. The resulting friction fit retains pan 12 in place on the tube or if desired additional soldering or welding or the like may be used.

Rim 13 may be formed by machining a steel ring into an L cross-section, or by machining a steel plate to both form the L and sever the ring from the remainder of the plate. Alternatively rim 13 may be formed from an initially straight, extruded strip of the desired L-shaped transverse cross section. The strip may be cut to proper length, bent into a circle, and the ends welded together, as indicated at 28, FIG. 2, the base of the L projecting inwardly of the circle. The resulting circular rim member is then forced downwardly about flange 21, until the bottom of the L lies substantially in the same plane as the bottom edge of flange 21. The inner edge of member 13 is then fixedly secured to flange 21, preferably by fused metal. This connection is advantageously accomplished by fusion welding, tack or spot welding, though either soldering or brazing can also be employed.

Screen element 14 is formed from metal screening in any suitable fashion and is installed by forcing inner flange 23 downwardly over tube 11 until the main body 22 extends properly across the top of pan 12 and outer flange 24 embraces the exposed upper portion of the outer cylindrical surface of flange 21 which extends above the base of the L-shaped rim 13. The unit is now complete, save for installation of the filter element 15 and retaining ring 25 in the manner hereinafter described.

It will be understood that inner flanges 20 and 23 engage tube 11 in fluid-tight relation and that the portion of filter element 15 disposed beneath ring 25 assures that unfiltered liquid cannot enter the pan 12 via the peripheral portion thereof. Where particularly great strength and rigidity are required, or an arrangement as in FIGURE 5 is used, flange 23 or the inner end of pan 12 may be fixed to tube 11 by fused metal.

The apparatus embodiment of the invention illustrated in FIGS. 1–3 has the advantage of extreme simplicity, both in assembly and in replacement of the filter elements. In assembling the filter apparatus for use, closure 5 being removed, the filter units 9 are simply inserted downwardly into place, the tube 11 of the lowermost unit seating in the top end of pipe 8 and the tubes 11 of the other units seating each in the upper end of the tube of the next lower unit. Cap 18 is then installed and closure 5 clamped in place. When it is necessary to replace filter elements 15, closure 5 and cap 18 are removed, and the filter units 9 lifted out. Ring 25 of each unit is extracted from its groove, the used filter element stripped away, and a new one laid in place. Ring 25 is then snapped back into its groove, fixing the filter element firmly in place, and the unit is re-installed in the tank 2. Similar simplicity in the FIGURE 5 embodiment is apparent.

Figure 4:
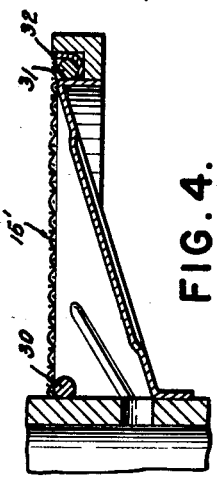
FIG. 4 is a view, similar to FIG. 1, of a modified form of filter unit in accordance with the invention.

FIG. 4 illustrates a modified form of filter unit in accordance with the invention, using a metallic mesh filter element instead of filter paper. Here, tube 11 and bottom pan 12 remain the same as described with reference to FIGS. 1–3. Rim member 13 also is unchanged and, in this embodiment, is welded or otherwise fixed directly to flange 21. Filter element 15' comprises a circular sheet of metallic fabric having a central opening of a diameter matching the outer diameter of tube 11. A metal reinforcing ring 30, having an inner diameter such that the ring tightly embraces tube 11 to afford a seal between the filter element and the tube, is welded to the bottom face of fabric sheet 15', about the central opening. An outer circular ring 31, of a plan diameter such that the ring can be inserted into the groove defined by flange 21 and rim member 13, is welded to the bottom face of sheet 15' at the periphery thereof.

Before filter element 15' is installed, an annular gasket strip 32 of paper or the like is laid over the groove defined by elements 13 and 21. Ring 30 is then forced over tube 11 until it reaches the position shown and ring 31 engages gasket strip 32. Ring 31 is then forced into its retaining groove, causing strip 32 to be deformed to the position seen in FIG. 4, so that the gasket strip seals between ring 31 and member 13 to prevent unfiltered liquid from entering beneath element 15'.

It is apparent that in lieu of the ring 30 of FIGURE 4, the annular shoulder 34 of FIGURE 5 may be used as the support for the inner end of the metallic mesh filter element 15'.

It is apparent that the assembly of tube 11, pan 12 and rim 13 of FIG. 4 can be fabricated by the same method hereinbefore described, save that no screen element 14 is necessary to support the relatively rigid metallic filter element 15'. And if desired the dimples 27 may be arranged as in FIGURE 5 to provide intermediate support for the metallic filter element 15'.

While advantageous embodiments of the invention have been illustrated and described, it is apparent that various changes and modifications can be made without departing from the scope of the invention, such as the construction of rectangular rather than circular filter units and the inversion of filter units upon which the filter elements are adequately secured. Accordingly the foregoing description is to be construed as illustrative only and not as a limitation upon the invention as defined in the following claims.

What is claimed is:

1. In a filter unit of the type described, the combination of
an upright tubular support provided with at least one lateral filtrate entrance;
a bottom pan of sheet material having an opening through which said support extends,
said pan having an outer annular flange extending at least generally parallel to the longitudinal axis of said support;
an annular member embracing said flange and secured thereto,
said annular member and said flange cooperating to define an upwardly opening annular groove;
a filter element having an opening through which said support extends,
said filter element extending outwardly to said groove and closing the top of said pan;
and an annular retaining ring removably retained in said groove and operatively associated with said filter element to pack the same in place,
said pan being sealed to said support and said filtrate entrance being disposed between said pan and said filter element.

2. A filter unit in accordance with claim 1 and further comprising
a filter element support in the form of a perforate sheet having an outer annular flange embracing an upper portion of said flange of said pan, and an opening through which said tubular support projects, the main body of said perforate sheet extending across the top of said pan,
said outer annular flange of said filter element support extending into the said upwardly opening annular groove.

3. In a filter unit of the type described, the combination of
an upright tubular support having at least one lateral filtrate-admitting port;
an integral sheet metal pan comprising
an at least generally frusto-conical downwardly and inwardly tapering main body,
a cylindrical inner flange embracing said tubular support in sealed relation below said port, and
an outer annular flange;
an annular metal rim embracing said outer flange and secured thereto,
said outer flange and said rim cooperating to define an upwardly opening annular groove;
a filter element extending across and closing the top of said pan in a location above said port; and
a retaining ring removably seated in said groove and operatively associated with said filter element to pack the same in operative position.

4. A filter unit in accordance with claim 3 and further comprising
a filter element support in the form of a perforate metal sheet having an outer annular dependent flange embracing an upper exposed portion of said outer flange of said pan.

5. A filter unit in accordance with claim 4
said filter element support further having an upwardly extending internal flange for embracing said tubular support for releasably securing said filter element between said tubular support and said outer flange of said sheet metal pan.

6. A filter unit in accordance with claim 3 and wherein said rim is of L-shaped transverse cross section, the base of the L thereof projecting inwardly and being secured to said outer flange.

7. The method for fabricating a filter unit of the type described comprising
providing a tubular support member having at least one lateral filtrate-admitting port;
forming from a single metal sheet a pan having an at least generally frusto-conical body,
a dependent inner cylindrical flange of smaller diameter than the outer diameter of the support member,
and an outer dependent annular flange;
forcing said support member axially through said inner cylindrical flange until said port is disposed above said pan;
forming a metal ring of L-shaped transverse cross section with the base of the L projecting inwardly of the ring;
placing said ring about said outer flange with the free edge afforded by the base of the L engaging the outer face of said annular flange;
securing said ring and outer body flange together;
forming a single perforate metal sheet into a filter element support having a flat main body,
an upwardly projecting inner cylindrical flange and
an outer dependent annular flange;
and positioning said filter element support across the top of said pan with the inner flange of said filter element support embracing said tubular support member above said port and said outer annular flange thereof embracing an exposed upper portion of said outer dependent flange of said pan.

8. The method according to claim 7 wherein
said ring and outer body flange are secured together by welding at spaced spots.

References Cited in the file of this patent

UNITED STATES PATENTS

| | | |
|---|---|---|
| 608,655 | Douglas | Aug. 9, 1898 |
| 812,931 | Kiefer | Feb. 20, 1906 |
| 1,951,809 | Renfrew | Mar. 20, 1934 |
| 1,976,273 | White | Oct. 9, 1934 |
| 2,081,300 | Hopper | May 25, 1937 |
| 2,754,973 | Muller | July 17, 1956 |
| 2,903,136 | Buckman | Sept. 8, 1959 |
| 3,033,373 | Mueller | May 8, 1962 |

FOREIGN PATENTS

| | | |
|---|---|---|
| 421,065 | Italy | May 16, 1947 |
| 499,311 | Belgium | Mar. 1, 1951 |